May 21, 1968 A. MANOOGIAN 3,384,119

MIXING VALVE

Filed March 16, 1966 2 Sheets-Sheet 1

INVENTOR.
ALEX MANOOGIAN
BY Whittemore,
Hulbert & Belknap
ATTORNEYS

INVENTOR.
ALEX MANOOGIAN
BY Whittemore,
Hulbert & Belknap
ATTORNEYS

United States Patent Office 3,384,119
Patented May 21, 1968

3,384,119
MIXING VALVE
Alex Manoogian, Detroit, Mich., assignor to Masco Corporation, Detroit, Mich., a corporation of Michigan
Filed Mar. 16, 1966, Ser. No. 534,751
3 Claims. (Cl. 137—625.17)

This invention relates to a new and improved mixing valve and particularly to a disc type single lever mixing valve in which the mix and flow of two fluids passing through the valve are independently variable.

Accordingly, an object of the invention is to provide a new and improved mixing valve.

Another object of the invention is to provide an improved disc type single lever mixing valve for independently varying the mix and flow of two fluids passing through the valve.

Other objects and features of the invention will become apparent as the description proceeds, especially when taken in conjunction with the accompanying drawings, illustrating a preferred embodiment of the invention, wherein.

Figure 1:
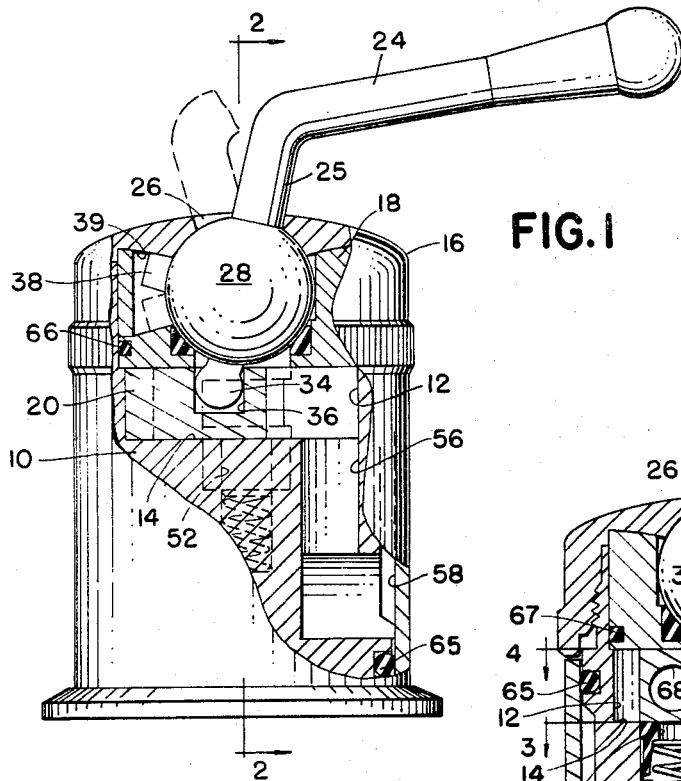
FIGURE 1 is a partially broken away side view of a mixing valve according to the invention.
Figure 2:
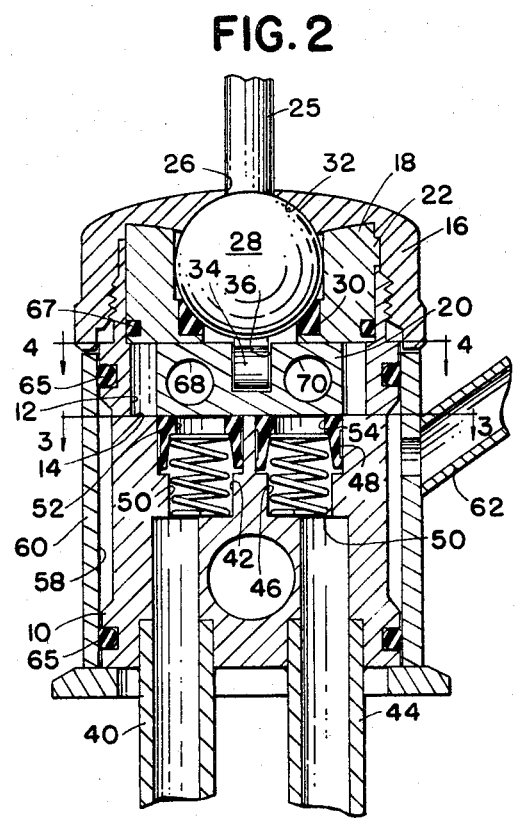
FIGURE 2 is a sectional view taken along line 2—2 of FIGURE 1.
Figure 3:
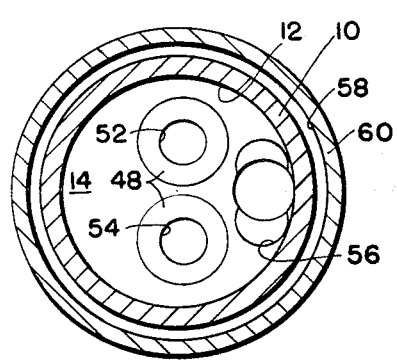
FIGURE 3 is a sectional view taken along line 3—3 of FIGURE 2.

As shown in the drawings, the valve body 10 has a circular recess 12 in one end thereof with a flat bottom 14 which serves as a valve seat. A valve cap 16 is threadably secured to the body 10 and holds an annular nylon spacer 18 against the flat valve member 20 seated in the bottom of the recess 12. Spacer 18 includes a key 22 engageable in a slot in the valve body so as to prevent rotation of the spacer during tightening down of the cap. A control lever 24 having stem portion 25 extends through slot 26 in the cap and is secured to ball 28 confined between sealing gasket 30 in spacer 18 and recess 32 in the cap. Ball 28 carries a finger 34 which is fitted within groove 36 in the upper surface of the valve member 20. The finger 34 is generally cylindrical in shape with a width slightly less than the width of the groove 36 and a diameter equal to the length of the groove so that the cylindrical sides of the finger engage the groove end walls. The depth of groove 36 is somewhat greater than the diameter of finger 34. Movement of the control lever 24 is limited by stop 38 on ball 28 which is confined in recess 39 between the cap 16 and spacer 18.

Hot water pipe 40 is in fluid flow communication with hot water inlet 42, and cold water pipe 44 is in fluid flow communication with cold water inlet 46. Each inlet is provided with an annular rubber sealing gasket 48 which is urged against the bottom face of valve member 20 by a spring 50 so as to make sealing contact therewith. The openings through the gaskets 48 define hot water inlet port 52 and cold water inlet port 54. Outlet port 56 is located to one side of the inlet ports and is in fluid flow communication with an annular chamber 58 between the valve body 10 and a sleeve 60. A spout 62 communicates with chamber 58. The body 10 carries O-rings 65 at each end of the sleeve 60 to prevent leakage from the chamber 58. An O-ring 67 is also provided between the spacer 18 and body 10.

The valve member 20 is provided with spaced hot and cold valving passages 64 and 66 which extend completely through the valve member. Lateral passages 68 and 70 extend from the side wall 71 of valve member 20 and intersect the valving passages 64 and 66 respectively so that passages 64 and 66 are always in fluid flow communication with the outlet port 56. The inlet ports 52 and 54 and the valving passages 64 and 66 are circular and of the same diameter so that when the valve member 20 is positioned in the full hot position illustrated in FIGURE 7 or the full cold flow position of FIGURE 6, the respective inlet port and valving passage are aligned and allow unhampered fluid flow through the valve.

Figure 4:
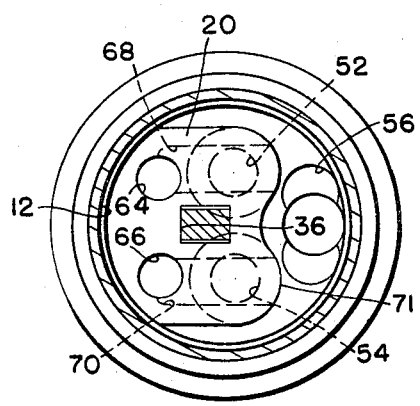
FIGURE 4 is a sectional view taken along line 4—4 of FIGURE 2.
Figure 5:
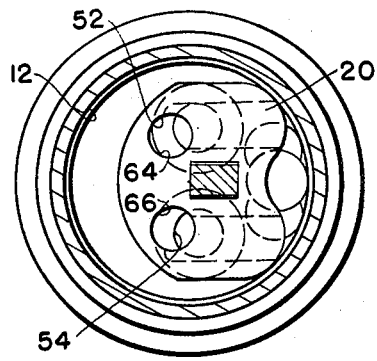

The valve member 20 may be either translated or rotated relative to the valve seat 14 dependent upon the motion imparted to the control lever 24. When the lever is rocked back and forth within the groove 26 the valve member 20 is translated from the off position as illustrated in FIGURES 1 and 4 where the valving passages 64 and 66 are sealed from the inlet ports 52 and 54 to the full on position as illustrated in FIGURE 5 where the valving passages 64 and 66 equally expose part of each inlet port 52 and 54 so that equal amounts of hot and cold water will pass through the passages 68 and 70 in the valve plate and become mixed together in the outlet 56 before being discharged through spout 62. It will be seen that as the lever 24 is rocked from the full on position as illustrated in dotted lines in FIGURE 1 toward the full off position, the exposed areas of the inlet ports 52 and 54 will be uniformly decreased so that the mix will be retained while the flow is gradually cut off.

When the control lever 24 is rotated about the axis of the stem portion 25, the valve member 20 is rotated across the flat valve seat 14 about a vertical axis passing through the center of the finger 34. As illustrated in FIGURES 4 through 7, this axis always lies in a plane perpendicular to the valve seat and spaced equidistant between the centers of the inlet ports 52 and 54.

Figure 6:
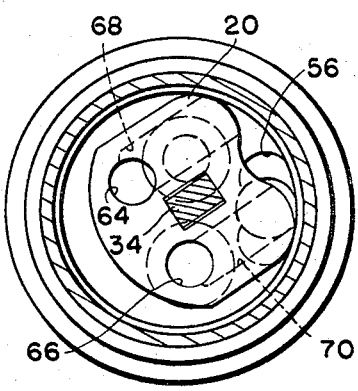
FIGURES 5, 6 and 7 are views similar to FIGURE 4 showing the valve in different positions.
Figure 7:
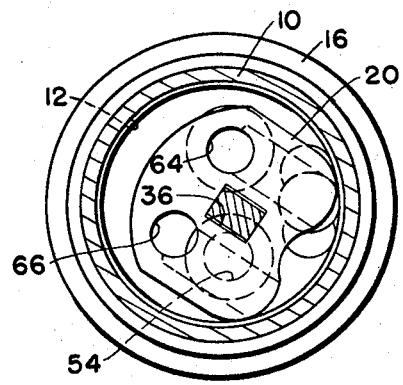
Figure 8:
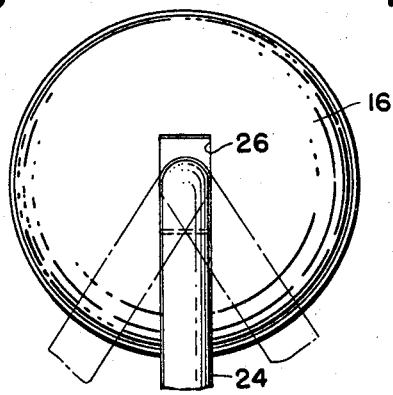
FIGURE 8 is a top view of the valve.

Rotation of the stem 25 about its axis while the lever is in the full flow position illustrated by dotted lines in FIGURE 1 rotates the valve member 20 from the full cold flow position illustrated in FIGURE 6 through the full flow equal mix position illustrated in FIGURE 5 to the full hot flow position of FIGURE 7. During rotation of the stem 25 the flow is essentially constant as the mix varies. Likewise when the control lever is moved partially toward the off position, rotation about the axis of the stem 25 rotates the valve member 20 across the valve seat 14 so that the valving passages 64 and 66 continuously vary the reduced flow from cold to hot. When the lever is rocked in slot 26 to the off position, rotation about the axis of stem 25 does not result in flow since the valving passages 64 and 66 do not engage the inlet ports 52 and 54.

The variation in mix of the fluid passing through the valve when the lever is rotated about the axis of stem 25 is substantially uniform due to the spacing of the groove 36, the inlet ports 52 and 54, and the valving passages 64 and 66. The centers of the valving passages 64 and 66 are somewhat more closely spaced than the centers of the inlet ports 52 and 54 and are equally spaced from the vertical axis of rotation of the valve member 20 a distance equal to one-half the distance between the centers of the inlet ports 52 and 54. By utilizing the described valve geometry, the improved mixing as described is attained.

While I have illustrated and described a preferred embodiment of my invention, it is understood that this is capable of modification, and I therefore do not wish to be limited to the precise details set forth but desire to avail myself of such changes and alterations as fall within the purview of the following claims.

What I claim as my invention is:

1. A hot and cold water mixing valve comprising a valve body, a flat valve seat formed in said valve body and having hot and cold water inlets and an outlet communicating therewith, sealing means within each inlet having a circular opening coaxial with its inlet and opening into said seat so as to define spaced circular hot and cold water inlet ports, a flat valve member having a flat surface slidable over said valve seat and sealingly engaging said sealing means, cap means secured to said valve body for slidably confining said valve member against said valve seat, said valve member having circular hot and cold water outlet ports opening from said flat surface and a separate passage intersecting each outlet port and in continuous fluid flow communication with said outlet in said valve body, said outlet ports having the same diameter as said inlet ports and being spaced apart a distance slightly less than said inlet ports, a control groove in the face of said valve member opposite said flat surface and located symmetrically between said outlet ports and to one side of a line joining the centers thereof, a control lever mounted in said cap means for limited rotation about its axis and about a second axis spaced from and parallel to a line joining the centers of said inlet ports, one end of said lever forming a finger which is cylindrically shaped with its axis transverse to the lever, said finger being seated within said groove with the cylindrical wall thereof engaging the end walls of said groove, the axial length of said finger being less than the width of said groove and the depth of said groove being greater than the diameter of said finger whereby rotation of said lever about its axis rotates said valve member thereby to rotate said outlet ports relative to said inlet ports so as to vary the mix of the water flowing through the valve while maintaining the volume of flow substantially constant, and rotation of said lever about said second axis translates said valve member thereby to translate said outlet ports relative to said inlet ports so as to vary the volume of flow passing through the valve while holding the mix substantially constant.

2. A mixing valve as in claim 1 wherein said groove is located to one side of a line between the centers of said outlet ports, and the centers of said outlet ports are each located a distance from the center of said groove equal to one-half the distance between the centers of said inlet ports.

3. A mixing valve as in claim 1 wherein said outlet in said valve body is disposed to one side of and spaced from a line between said inlets, and said passages in said valve body are generally parallel and extend from their respective outlet ports toward said outlet to provide a straight flow path from said passages to said outlet in any position of said valve member.

References Cited

UNITED STATES PATENTS

| | | | |
|---|---|---|---|
| 2,977,986 | 4/1961 | Hinderer et al. | 137—636.2 X |
| 3,023,784 | 3/1962 | Monson | 137—625.17 |
| 3,324,884 | 6/1967 | Dornaus | 137—625.17 |

M. CARY NELSON, *Primary Examiner.*

J. R. DWELLE, *Assistant Examiner.*